(12) United States Patent
Chou (10) Patent No.: US 9,535,697 B2
(45) Date of Patent: Jan. 3, 2017

(54) REGISTER WINDOW PERFORMANCE VIA LAZY REGISTER FILLS

(71) Applicant: Oracle International Corporation, Redwood City, CA (US)

(72) Inventor: Yuan C. Chou, Los Gatos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 741 days.

(21) Appl. No.: 13/932,473

(22) Filed: Jul. 1, 2013

(65) Prior Publication Data
US 2015/0006864 A1    Jan. 1, 2015

(51) Int. Cl.
*G06F 9/00* (2006.01)
*G06F 9/44* (2006.01)
*G06F 9/30* (2006.01)
*G06F 9/38* (2006.01)

(52) U.S. Cl.
CPC ....... *G06F 9/30127* (2013.01); *G06F 9/30043* (2013.01); *G06F 9/383* (2013.01); *G06F 9/3863* (2013.01)

(58) Field of Classification Search
None
See application file for complete search history.

(56) References Cited

U.S. PATENT DOCUMENTS

| 5,644,742 A * | 7/1997 | Shen ............... G06F 9/3004 712/244 |
| 2003/0229771 A1* | 12/2003 | Thimmanagari ... G06F 9/30043 712/218 |
| 2003/0229772 A1* | 12/2003 | Thimmanagari ... G06F 9/30043 712/228 |
| 2004/0133766 A1* | 7/2004 | Abraham ........... G06F 9/30127 712/217 |
| 2004/0215941 A1* | 10/2004 | Thimmannagari . G06F 9/30043 712/228 |
| 2008/0010425 A1* | 1/2008 | Funk ................ G06F 12/1491 711/163 |
| 2008/0016325 A1* | 1/2008 | Laudon ............. G06F 9/3012 712/217 |
| 2008/0091920 A1* | 4/2008 | Shaw ................ G06F 9/3005 712/202 |
| 2008/0209175 A1* | 8/2008 | Brown .............. G06F 9/45504 712/208 |
| 2013/0166810 A1* | 6/2013 | Byun ................ G06F 9/30127 710/308 |

* cited by examiner

*Primary Examiner* — Michael Sun
(74) *Attorney, Agent, or Firm* — Park, Vaughan, Fleming & Dowler LLP (57) ABSTRACT

The present embodiments provide a system that facilitates lazy register window fills in a processor. During program execution, when the system encounters a restore instruction for a register window, the system determines if the restore instruction causes an underflow condition that requires the register window to be filled from a stack in memory. If so, the system completes the restore instruction by updating state information for the register window to indicate that the restore instruction is complete without actually filling the individual registers that comprise the register window from the stack. During subsequent program execution, the system lazily fills registers in the register window from the stack as the registers are accessed by the program.

16 Claims, 5 Drawing Sheets

LAZY FILL
TECHNIQUE

RESTORE (CANRESTORE == 0)

INSERT
CANRESTORE++
INTO PIPELINE
AHEAD OF RESTORE

RUTA 205

| | $R_0$ | $R_1$ | $R_2$ | ... | $R_{N-1}$ |
|---|---|---|---|---|---|
| WINDOW$_0$ | $R_0$ | $R_1$ | $R_2$ | ... | $R_{N-1}$ |
| WINDOW$_1$ | $R_0$ | $R_1$ | $R_2$ | ... | $R_{N-1}$ |
| WINDOW$_2$ | $R_0$ | $R_1$ | $R_2$ | ... | $R_{N-1}$ |
| ⋮ | | | | | |
| WINDOW$_{N-1}$ | $R_0$ | $R_1$ | $R_2$ | ... | $R_{N-1}$ |

REGISTER WINDOW PERFORMANCE VIA LAZY REGISTER FILLS

BACKGROUND

Field

The disclosed embodiments generally relate to techniques for improving performance in computer systems. More specifically, the disclosed embodiments relate to a technique for improving the performance of register window operations in computer systems by performing lazy register fills.

Related Art

The use of register windows can greatly improve processor performance by eliminating the need to save and restore registers when a program makes function calls. It does so by providing multiple sets of registers, one set (called a window) for each function call, with adjacent sets being overlapped to enable parameter passing between functions. However, when a processor runs out of windows to allocate to a new function call, it has to spill the contents of one of the register windows to a stack in memory in order to make the register window available for the new function call. This condition is called a "register window overflow." Similarly, when this spilled window of registers subsequently needs to be accessed by the program, the registers have to be restored from the stack. This condition is called a "register window underflow."

In existing processors, register window overflows and underflows are typically handled via software traps (referred to as "spill traps" and "fill traps," respectively). These traps are expensive operations because they typically generate a processor pipeline flush before entering the trap handler and another flush after exiting the trap handler. Also, during a spill trap, all of the registers in the window (e.g., 16 registers in a SPARC™ architecture) are saved to the stack in memory, even though most of them are not live across the function call. Conversely, on a fill trap, all of the registers are restored from the stack even though most of them are not subsequently used. In fact, empirical results show that, for a wide range of applications, typically only four of the 16 registers are used. Moreover, register window underflows typically affect processor performance more than register window overflows. This is because the spill trap handler uses load instructions while the fill trap handler uses store instructions, and it is much more difficult for the processor to hide the latency of load instructions than to hide the latency of store instructions.

Because of the high cost of handling register window overflows and underflows, the use of register windows can degrade processor performance if an application generates too many overflows and underflows.

SUMMARY

The present embodiments provide a system that facilitates lazy register window fills in a processor. During program execution, when the system encounters a restore instruction for a register window, the system determines if the restore instruction causes an underflow condition that requires the register window to be filled from a stack in memory. If so, the system completes the restore instruction by updating state information for the register window to indicate that the restore instruction is complete without actually filling the individual registers that comprise the register window from the stack. During subsequent program execution, the system lazily fills registers in the register window from the stack as the registers are accessed by the program. (Note that the phrases "lazy fill operation" and "lazily filling registers" refer to a technique where registers are loaded from a register window located on the system stack. These register loading operations are referred to as "lazy" because they only take place when the data paths between the registers are memory are not busy.)

In some embodiments, completing the restore instruction includes updating the state information for the register window without executing a fill trap handler, and without incurring associated pipeline flushes.

In some embodiments, while lazily filling the registers from the stack, the system keeps track of which registers in the register window are valid by keeping track of which registers have been filled from the stack or have been updated during program execution. Next, upon encountering an instruction that reads a register in the register window, the system determines whether the register is valid. If not, the system fills the register from the stack before the instruction loads from the register.

In some embodiments, filling the register from the stack includes inserting a fill instruction for the register into an execution pipeline ahead of the instruction that loads from the register.

In some embodiments, completing the restore instruction further comprises generating one or more prefetch instructions to prefetch cache lines containing stack entries for the register window, thereby reducing the chance of a cache miss during subsequent lazy fill operations for the register window.

In some embodiments, keeping track of which registers in the register window are valid comprises maintaining a register use tracking array (RUTA), which includes state information indicating validity for each register in the register file.

In some embodiments, maintaining the RUTA includes maintaining a speculative copy of the RUTA at a decode stage of the execution pipeline and maintaining a non-speculative copy of the RUTA at a commit stage of the execution pipeline. During a pipeline flush, values in the non-speculative copy of the RUTA are used to update the speculative copy of the RUTA.

In some embodiments, upon encountering an instruction that writes a destination register in the register window, the system updates an entry in the RUTA for the destination register to indicate that the destination register is valid.

In some embodiments, upon executing a save instruction that flushes a register window to the stack to make room for a new register window, the system updates entries in the RUTA for the new register window to indicate that all of the registers in the new register window are valid.

In some embodiments, whenever an underflow condition is detected, the system determines how many registers in the register window were actually used. The system keeps track of this determined register usage for each function call. If the determined register usage for a given function call exceeds a threshold, during subsequent underflow conditions for the function call, the system forgoes lazy register fills and instead fills the entire register window from the stack by inserting load instructions into the execution pipeline.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments can drastically reduce the performance penalty of register window underflows by eliminating the need to flush the processor pipeline and by only restoring the registers that are actually used from the stack.

Figure 1A:
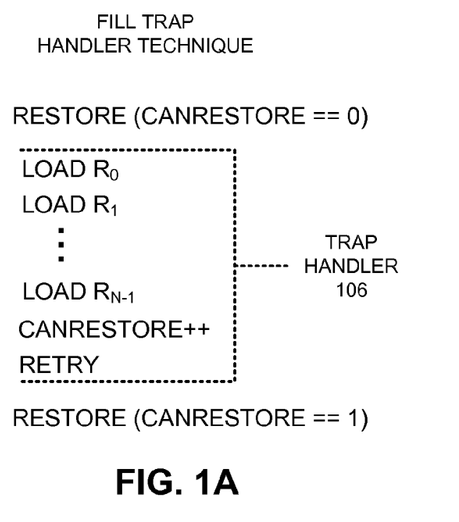
FIG. 1A illustrates a fill trap technique for handling a register window underflow in accordance with the described embodiments.

A conventional technique for handling a register window underflow is to use a trap handler as is illustrated in FIG. 1A. When the system decodes a register window restore instruction, if the system variable CANRESTORE=0, a register window underflow condition exists. This causes the system to execute a trap handler 106, which loads all of the registers $R_0, R_1, \ldots R_{N-1}$ from the stack into the register file. Trap handler 106 also increments CANRESTORE to indicate that another register window has been retrieved from the stack. Next, trap handler 106 causes a retry of the register window restore instruction. During the retry CANRESTORE=1, which indicates that the underflow condition no longer exists and the register window restore instruction can proceed normally. Note that using trap handler 106 is time-consuming because a pipeline flush is triggered at the start of trap handler 106 and also at the end of trap handler 106.

Figure 1B:
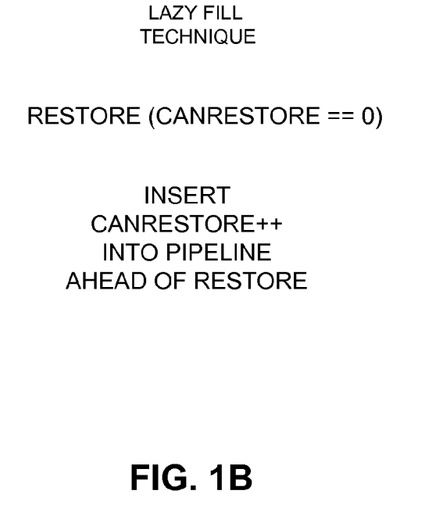
FIG. 1B illustrates a lazy fill technique for handling a register window underflow in accordance with the described embodiments.

In contrast, the disclosed embodiments do not use a trap handler to process register window underflows as is illustrated in FIG. 1B. When the system decodes a register window restore instruction and CANRESTORE=0, a register underflow condition exits. In this case, a fill trap is not generated and registers are not restored from the stack in memory until they are actually used. Instead, a single helper instruction (which increments CANRESTORE) is inserted into the pipeline ahead of the register window restore instruction. There is no need to flush the pipeline, nor is there a need to execute a fill trap handler.

Register usage is tracked by using a structure called a register use tracking array (RUTA). Subsequent instructions access the RUTA to determine if they are reading a register that has not yet been restored. If so, a helper load instruction is injected into the pipeline ahead of that instruction to restore the register from memory.

This process is described in more detail below, but first we describe a computer system that implements the above-described lazy fill technique.

Computer System

Figure 2:
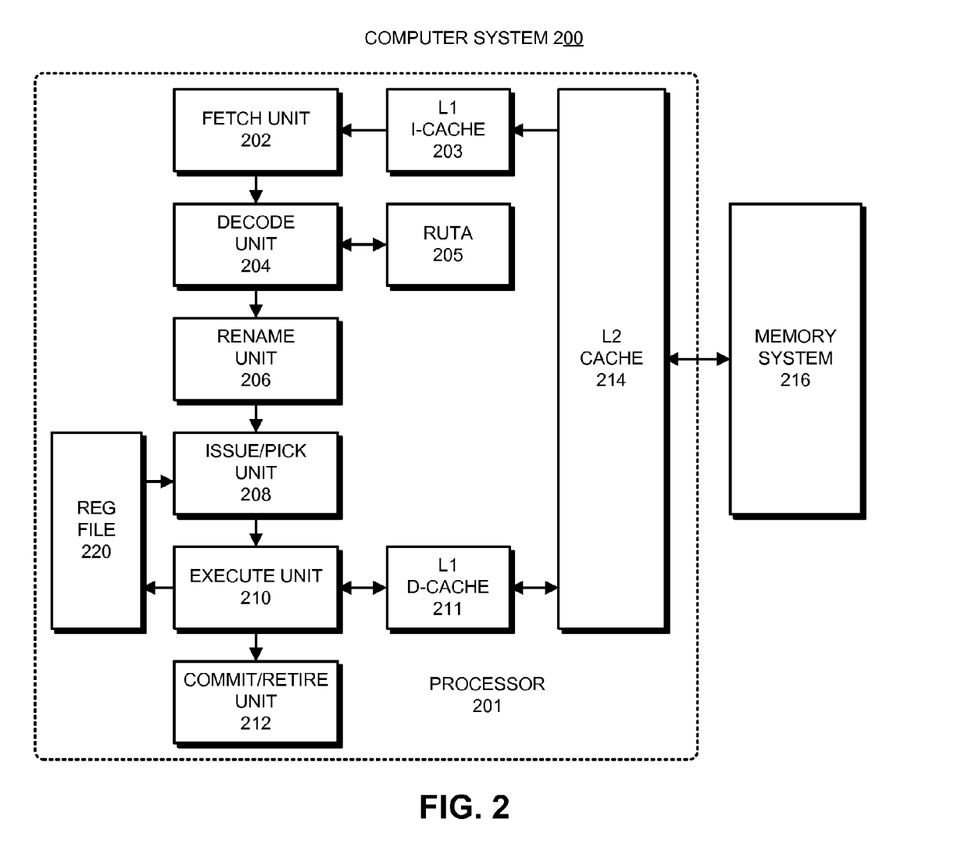
FIG. 2 illustrates a computer system in accordance with the described embodiments.

FIG. 2 illustrates a computer system 200 in accordance with the described embodiments. Computer system 200 can include any type of general-purpose or special-purpose computer system, including, but not limited to, a server, a desktop computer, a digital signal processor, a laptop computer, a notebook computer, a tablet computer, a personal digital assistant, a cell phone, a device controller, or a computational engine within an appliance. Computer system 200 includes a processor 201 and a memory system 216. Note that memory system 216 can include a main memory and possibly an L3 cache and an L4 cache.

Processor 201 includes an execution pipeline comprising a fetch unit 202, a decode unit 204, a rename unit 206, an issue/pick unit 208, an execute unit 210 and a commit/retire unit 212. During program execution, fetch unit 202 retrieves an instruction from level-one (L1) instruction cache (I-cache) 203. This instruction feeds through decode unit 204 which decodes the instruction, and then through rename unit 206, which performs register-renaming operations to identify the relevant operands for the instruction. Next, the decoded instruction feeds into issue/pick unit 208, which selects an instruction with valid source operands to be executed. The selected instruction feeds into execute unit 210, which executes the instruction, wherein the execution can involve accessing data stored in L1 data cache (D-cache) 211 and accessing data stored in register file 220.

Register file 220 is configured to support register windowing and is associated with a current window pointer (CWP). Source operands for an instruction can be retrieved from one or more source registers in a register window pointed to by the CWP. Moreover, destination operands can be written to one or more destination registers pointed to by the CWP.

At the end of the execution pipeline, the instruction feeds into commit/retire unit 212, which commits results produced during execution of the instruction.

Note that L1 I-cache 203 and L1 D-cache 211 both access a unified L2 cache 214, which stores both instruction cache lines and data cache lines. L2 cache 214, in turn, communicates with memory system 216.

Computer system 200 also includes a special structure called a register use tracking array (RUTA) 205, which supports lazy register fills by keeping track of which registers are valid as is described in more detail below.

Register Use Tracking Array

Figure 3:
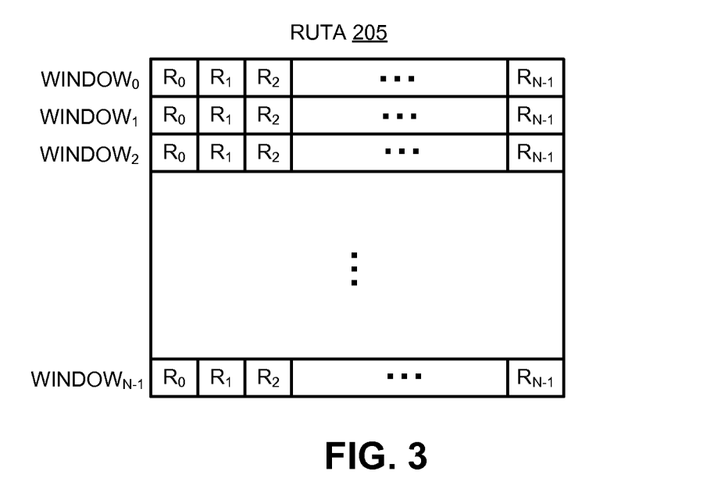
FIG. 3 illustrates a register use tracking array (RUTA) in accordance with the described embodiments.

FIG. 3 illustrates a register use tracking array (RUTA) 205 in accordance with the described embodiments. RUTA 205 can be implemented as a small multi-ported array that keeps track of which windowed registers can be read without having to first load their values from the program stack. RUTA 205 contains as many entries as the number of register windows supported by the processor (WINDOW$_0$, WINDOW$_1$, ... WINDOW$_{N-1}$). In an exemplary embodiment, there are eight register windows and eight corresponding entries in RUTA 205, where each entry is 16 bits wide, with one bit representing each of the eight "local" and eight "in" registers of that window. This array is indexed using the CWP. Note that with eight 16-bit entries, the total size of the RUTA 205 is only 128 bits.

In one embodiment, two copies of RUTA 205 exist: (1) a speculative copy maintained at decode unit 204, and (2) a non-speculative copy maintained at commit/retire unit 212 (not shown in FIG. 2). During a pipeline flush, the values in the non-speculative copy are copied into the speculative copy.

Decoding a Restore Instruction

Figure 4:
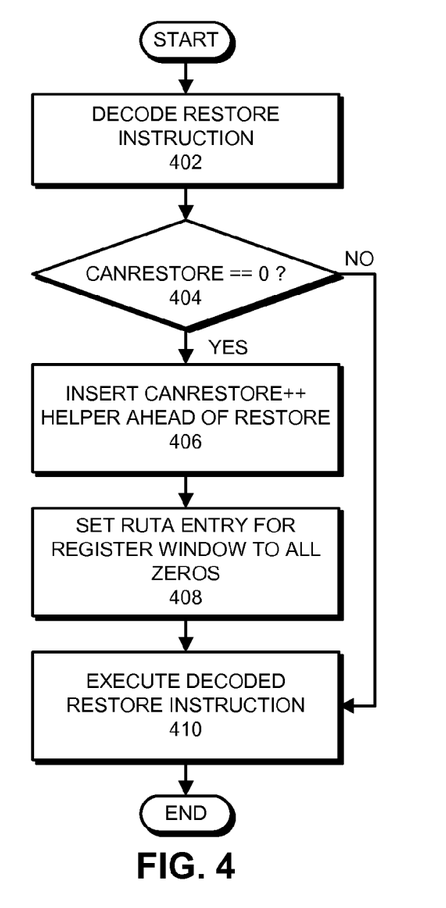
FIG. 4 presents a flow chart illustrating the process of decoding a register window restore instruction in accordance with the disclosed embodiments.

FIG. 4 presents a flow chart illustrating the process of decoding a register window restore instruction in accordance with the disclosed embodiments. When a register window restore instruction is decoded (step 402), the system determines whether the thread's CANRESTORE value is zero (step 404), which indicates that a register window underflow condition exists. If so (YES at step 404), the system does not execute an underflow trap handler, and instead inserts a helper instruction that increments CANRESTORE into the pipeline ahead of the register window restore instruction (step 406). The system also initializes the RUTA entry corresponding to the new CWP (i.e., the CWP of the new window) to all zeros (step 408), which indicates that none of the associated registers in the new current window has been loaded from the stack yet. Finally, the decoded register window restore operation is executed (step 410). As mentioned above, there is no need to flush the pipeline, nor is there any need to execute a fill trap handler.

If at step 404 CANRESTORE≠0 (NO at step 404), a register underflow condition does not exist. In this case, the decoded register window restore operation is executed (step 410) and the RUTA is not modified.

Decoding a Save Instruction

Figure 5:
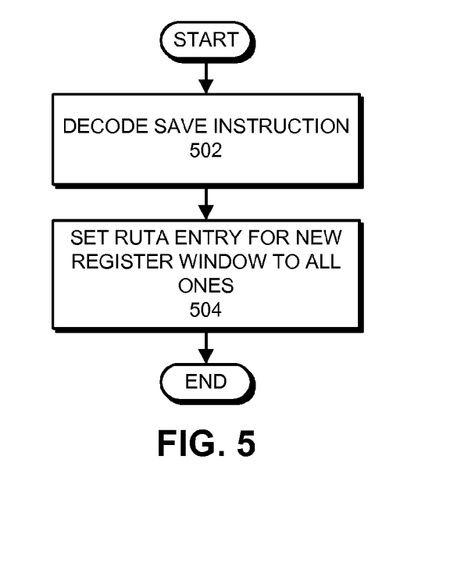
FIG. 5 presents a flow chart illustrating the process of decoding a register window save instruction in accordance with the disclosed embodiments.

FIG. 5 presents a flow chart illustrating the process of decoding a register window save instruction in accordance with the disclosed embodiments. At the start of the process, a register window save instruction is decoded (step 502). Upon detecting that a register window save instruction is being decoded, the system initializes the RUTA entry corresponding to the new CWP by setting all of the bits in the RUTA entry to ones (step 504).

Decoding an Instruction that Accesses Source and Destination Registers

Figure 6:
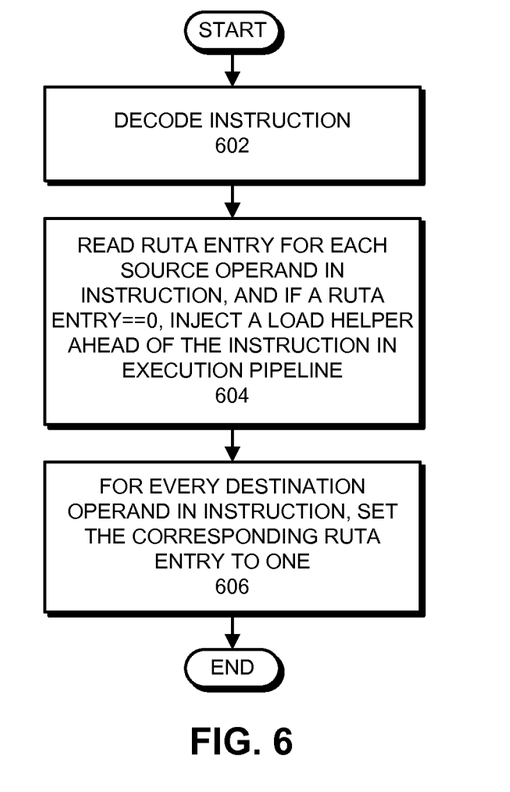
FIG. 6 presents a flow chart illustrating the process of decoding an instruction that accesses source and destination operands from registers in a register window in accordance with the disclosed embodiments.

FIG. 6 presents a flow chart illustrating the process of decoding an instruction that accesses source and destination operands from registers in a register window in accordance with the disclosed embodiments. When an instruction is decoded (step 602), the system determines whether the instruction reads any operands from source registers. If so, the system reads the RUTA entry for each source register. If the RUTA entry for a source register is zero, the register needs to be restored from the stack before it can be read. In this case, a load helper instruction is inserted ahead of the instruction in the execution pipeline (step 604). Note that if an instruction reads more than one source register that needs to be restored from the stack, more than one fill helper instruction may be inserted.

As an example for the SPARC™ instruction set, if the %i0 operand in the instruction add %i0, 4, %o0 needs to be restored from the stack, the following helper instruction is inserted before the add instruction:
ldx[%sp+0x83f],%i0.
This load helper instruction restores the value of register %i0 from the stack prior to its use by the add instruction.

When the instruction is decoded, the system also determines whether the instruction writes any operands to destination registers. If so, the system sets the RUTA entry for each such destination register to one (step 606).

Prefetching

In some embodiments, prefetching can be used to improve performance for lazy register fills. When a restore register window instruction is decoded and a register window underflow is detected, the following sequence of helper instructions can be inserted into the pipeline ahead of the RESTORE instruction. (Note that the "restored" instruction increments CANRESTORE.)
prefetch[%sp+0x7ff]
prefetch[%sp+0x83f]
restored The purpose of the prefetch instructions is to pre-load the two cache lines from the stack containing the local/in windowed registers that may potentially be restored later. This optimization can improve performance by increasing the probability that the two cache lines will already be in the cache by the time they are accessed.

Non-Lazy Register Fills

In some embodiments, lazy register fills can be selectively disabled in cases where a function tends to use a large number of registers. This can be accomplished as follows. For every occurrence of a register window underflow, the number of registers actually used by the function is counted. For every N instances, if in M of those instances the number of registers used exceeds a specified threshold, then for the next N instances, windowed registers are no longer lazily filled. Instead, during a register window underflow, the following sequence of helper instructions is inserted into the pipeline ahead of the RESTORE instruction.
ldx[%sp+0x7ff],%l0
ldx[%sp+0x807],%l1
ldx[%sp+0x80f],%l2
ldx[%sp+0x817],%l3
ldx[%sp+0x81f],%l4
ldx[%sp+0x827],%l5
ldx[%sp+0x82f],%l6
ldx[%sp+0x837],%l7
ldx[%sp+0x83f],%i0
ldx[%sp+0x847],%i1
ldx[%sp+0x84f],%i2

```
ldx[%sp+0x857],%i3
ldx[%sp+0x85f],%i4
ldx[%sp+0x867],%i5
ldx[%sp+0x86f],%fp
ldx[%sp+0x877],%i7
restored
```

These helper instructions restore all of the window's registers from the stack in memory. Note that there is still no need to flush the pipeline, nor is there a need to execute a fill trap handler. This optimization improves performance because restoring all the windowed registers when the window underflow is detected is less expensive than lazily restoring individual registers if the number of registers actually used by the function exceeds the threshold.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for facilitating lazy register window fills, comprising:
   while executing a program, upon encountering a restore instruction for a register window, determining if the restore instruction causes an underflow condition that requires the register window to be filled from a stack in memory; and
   if the restore instruction causes an underflow condition,
      completing the restore instruction by updating state information for the register window to indicate that the restore instruction is complete without actually filling individual registers that comprise the register window from the stack, and
      during subsequent program execution, lazily filling registers in the register window from the stack as the registers are accessed by the program by:
         keeping track of which registers in the register window are valid by keeping track of which registers have been filled from the stack or have been updated during program execution; and
         upon encountering an instruction that loads from a register in the register window, determining if the register is valid, and if not filling the register from the stack before the instruction loads from the register by inserting a fill instruction for the register into an execution pipeline ahead of the instruction that loads from the register.

2. The method of claim 1, wherein completing the restore instruction includes updating the state information for the register window without executing a fill trap handler, and without incurring one or more associated pipeline flushes.

3. The method of claim 1, wherein completing the restore instruction further comprises generating one or more prefetch instructions to prefetch cache lines containing stack entries for the register window.

4. The method of claim 1, wherein keeping track of which registers in the register window are valid comprises maintaining a register use tracking array (RUTA), which includes state information indicating validity for each register in the register file.

5. The method of claim 4,
   wherein maintaining the RUTA includes maintaining a speculative copy of the RUTA at a decode stage of the execution pipeline and maintaining a non-speculative copy of the RUTA at a commit stage of the execution pipeline; and
   wherein during a pipeline flush, values in the non-speculative copy of the RUTA are used to update the speculative copy of the RUTA.

6. The method of claim 4, wherein upon encountering an instruction that stores to a destination register in the register window, updating an entry in the RUTA for the destination register to indicate that the destination register is valid.

7. The method of claim 4, wherein upon executing a save instruction that flushes a register window to the stack to make room for a new register window, updating entries in the RUTA for the new register window to indicate that all of the registers in the new register window are valid.

8. The method of claim 1, further comprising:
   whenever an underflow condition is detected, determining how many registers in the register window were used;
   keeping track of the determined register usage for each function call; and
   if the determined register usage for a given function call exceeds a threshold, during subsequent underflow conditions for the function call, filling the entire register window from the stack by inserting load instructions into the execution pipeline.

9. A system that facilitates lazy register window fills, comprising:
   a processor including an execution mechanism for executing instructions;
   wherein while executing a program, upon encountering a restore instruction for a register window, the execution mechanism is configured to determine if the restore instruction causes an underflow condition that requires the register window to be filled from a stack in memory; and
   if the restore instruction causes an underflow condition, the execution mechanism is configured to,
      complete the restore instruction by updating state information for the register window to indicate that the restore instruction is complete without actually filling individual registers that comprise the register window from the stack, and
      during subsequent program execution, lazily fill registers in the register window from the stack as the registers are accessed by the program by:
         keeping track of which registers in the register window are valid by keeping track of which registers have been filled from the stack or have been updated during program execution; and
         upon encountering an instruction that loads from a register in the register window, determining if the register is valid, and if not filling the register from the stack before the instruction loads from the register by inserting a fill instruction for the register into an execution pipeline ahead of the instruction that loads from the register.

10. The system of claim 9, wherein while completing the restore instruction, the execution mechanism is configured to generate one or more prefetch instructions to prefetch cache lines containing stack entries for the register window.

11. The system of claim 9, wherein while keeping track of which registers in the register window are valid, the execution mechanism is configured to maintain a register use tracking array (RUTA), which includes state information indicating validity for each register in the register file.

12. The system of claim 11,
wherein while maintaining the RUTA, the execution mechanism is configured to maintain a speculative copy of the RUTA at a decode stage of the execution pipeline and to maintain a non-speculative copy of the RUTA at a commit stage of the execution pipeline; and
wherein during a pipeline flush, the execution mechanism is configured to use values in the non-speculative copy of the RUTA to update the speculative copy of the RUTA.

13. The system of claim 11, wherein upon encountering an instruction that stores to a destination register in the register window, the execution mechanism is configured to update an entry in the RUTA for the destination register to indicate that the destination register is valid.

14. The system of claim 11, wherein upon executing a save instruction that flushes a register window to the stack to make room for a new register window, the execution mechanism is configured to update entries in the RUTA for the new register window to indicate that all of the registers in the new register window are valid.

15. The system of claim 9,
wherein whenever an underflow condition is detected, the execution mechanism is configured to determine how many registers in the register window were used;
wherein the execution mechanism is configured to keep track of the determined register usage for each function call; and
wherein if the determined register usage for a given function call exceeds a threshold, during subsequent underflow conditions for the function call, the execution mechanism is configured to fill the entire register window from the stack by inserting load instructions into the execution pipeline.

16. A computer system that facilitates lazy register window fills, comprising:
a processor including an execution mechanism for executing instructions; and
a memory for storing instructions and data;
wherein while executing a program, upon encountering a restore instruction for a register window, the execution mechanism is configured to determine if the restore instruction causes an underflow condition that requires the register window to be filled from a stack in memory; and
if the restore instruction causes an underflow condition, the execution mechanism is configured to,
complete the restore instruction by updating state information for the register window to indicate that the restore instruction is complete without actually filling individual registers that comprise the register window from the stack, and
during subsequent program execution, lazily fill registers in the register window from the stack as the registers are accessed by the program by:
keeping track of which registers in the register window are valid by keeping track of which registers have been filled from the stack or have been updated during program execution; and
upon encountering an instruction that loads from a register in the register window, determining if the register is valid, and if not filling the register from the stack before the instruction loads from the register by inserting a fill instruction for the register into an execution pipeline ahead of the instruction that loads from the register.

* * * * *